(12) United States Patent
Ninan

(10) Patent No.: US 8,963,824 B2
(45) Date of Patent: Feb. 24, 2015

(54) BACK LIGHT UNIT FOR STEREOSCOPIC DISPLAY

(75) Inventor: Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 78 days.

(21) Appl. No.: 13/805,317

(22) PCT Filed: Jun. 27, 2011

(86) PCT No.: PCT/US2011/041999
§ 371 (c)(1),
(2), (4) Date: Dec. 18, 2012

(87) PCT Pub. No.: WO2012/006010
PCT Pub. Date: Jan. 12, 2012

(65) Prior Publication Data
US 2013/0093804 A1    Apr. 18, 2013

Related U.S. Application Data

(60) Provisional application No. 61/359,344, filed on Jun. 28, 2010.

(51) Int. Cl.
*G09G 3/36* (2006.01)
*G06T 15/00* (2011.01)
(Continued)

(52) U.S. Cl.
CPC ............... *G06T 15/00* (2013.01); *G09G 3/003* (2013.01); *G09G 3/3406* (2013.01); *G09G 2310/0237* (2013.01); *H04N 13/0431* (2013.01); *H04N 13/0434* (2013.01); *H04N 13/0438* (2013.01)
USPC ........................................................ 345/102

(58) Field of Classification Search
CPC ........... G09G 2320/0209; G09G 3/34–3/3433; G09G 3/003; G09G 2310/0237; H04N 13/004; H04N 13/0044; H04N 13/0434; H04N 13/0431; H04N 13/0438; G06T 15/00
USPC .................................................. 345/102, 109
See application file for complete search history.

(56) References Cited

U.S. PATENT DOCUMENTS 5,818,399 A    10/1998    Omori
6,268,881 B1    7/2001    Muramoto
(Continued)

FOREIGN PATENT DOCUMENTS

CN    101415126    4/2009
EP    2015589    1/2009
(Continued)

OTHER PUBLICATIONS

Liou, Jian-Chiun, et al. "120 Hz Low Cross-Talk Stereoscopic Display with Intelligent LED Backlight Enabled by Multi-Dimensional Controling IC" Displays, v 30, p. 148-154, Dec. 2009.
(Continued)

*Primary Examiner* — Liliana Cerullo

(57) ABSTRACT

Techniques for 3D back light units are described. In some possible embodiments, in a first time interval during which one or more back light units of a display system are turned off, a complete set of left pixel values in a left frame is outputted to a display panel of the display system. In some possible embodiments, in a second time interval during which the complete set of left pixel values in the left frame has been outputted to the display panel of the display system, the one or more back light units are turned on to illuminate the display panel and the second time interval is subsequent to, and is not overlapped with, the first time interval.

8 Claims, 12 Drawing Sheets

(51) Int. Cl.
*G09G 3/00* (2006.01)
*G09G 3/34* (2006.01)
*H04N 13/04* (2006.01)

(56) References Cited

U.S. PATENT DOCUMENTS

| | | |
|---|---|---|
| 6,377,230 B1 | 4/2002 | Yamazaki |
| 6,449,090 B1 | 9/2002 | Omar |
| 7,050,020 B2 | 5/2006 | Uehara |
| 7,072,110 B2 | 7/2006 | Palovuori |
| 7,677,733 B2 | 3/2010 | Brott |
| 2007/0153380 A1 | 7/2007 | Shestak |
| 2007/0188711 A1 | 8/2007 | Sharp |
| 2007/0229951 A1 | 10/2007 | Jung |
| 2008/0084513 A1 | 4/2008 | Brott |
| 2008/0316303 A1 | 12/2008 | Chiu |
| 2009/0244270 A1 | 10/2009 | Takagi |
| 2010/0020062 A1 | 1/2010 | Liou |
| 2010/0060857 A1 | 3/2010 | Richards |
| 2010/0066820 A1 | 3/2010 | Park |
| 2010/0208043 A1 | 8/2010 | Hoffman |
| 2011/0205251 A1* | 8/2011 | Auld ............................ 345/690 |

FOREIGN PATENT DOCUMENTS

| | | |
|---|---|---|
| WO | 2005/039192 | 4/2005 |
| WO | 2009/069026 | 6/2009 |
| WO | 2010/015867 | 2/2010 |

OTHER PUBLICATIONS

Gaskevich, Evgeny "2D/3D Switchable LCD Monitor with Chromatic Separation" Proc. of SPIE—The International Society for Optical Engineering, v. 7524, 2010, Proceedings of SPIE—IS and T Electronic Imaging, Stereoscopic Displays and Applications.

Woods, A. et al. "Characterising Sources of Ghosting in Time-Sequential Stereoscopic Video Displays" Proc. of the SPIE—The International Society for Optical Engineering v. 4660, 66-77, 2002.

Woods, Andrew A. "Compatibility of Display Products with Stereoscopic Display Methods" International Display Manufacturing Conference, Taiwan, Feb. 2005.

Woods, A. et al. "Compatibility of LCD Monitors with Frame-Sequential Stereoscopic 3D Visualisation" IMID/IDMC, the 6th International Meeting on Information Display, and the 5th International Display Manufacturing Conference, p. 98-102, Aug. 22-25, 2006.

Woods, A.J. et al. "The Compatibility of LCD TVs With Time-Sequential Stereoscopic 3D Visualization" Stereoscopic Displays and Applications XX, Proc. of Electronic Imaging, Proc. SPIE, vol. 7237, San Jose, CA, Jan. 19-21, 2009.

Liou, Jian-Chiun et al. "Shutter Glasses Stereo LCD with a Dynamic Backlight" Proc. of SPIE—The International Society for Optical Engineering, v. 7237, 2009.

\* cited by examiner

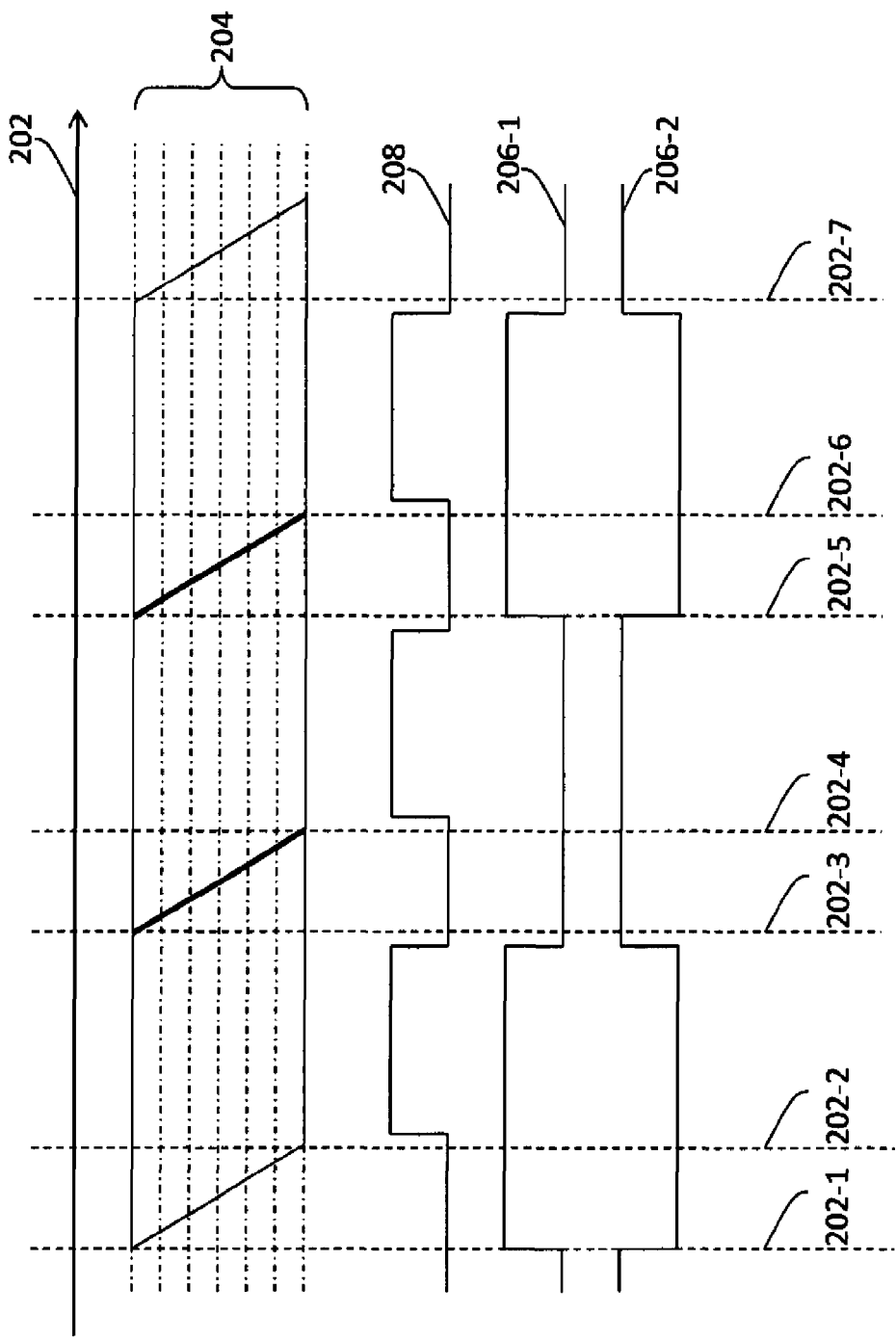

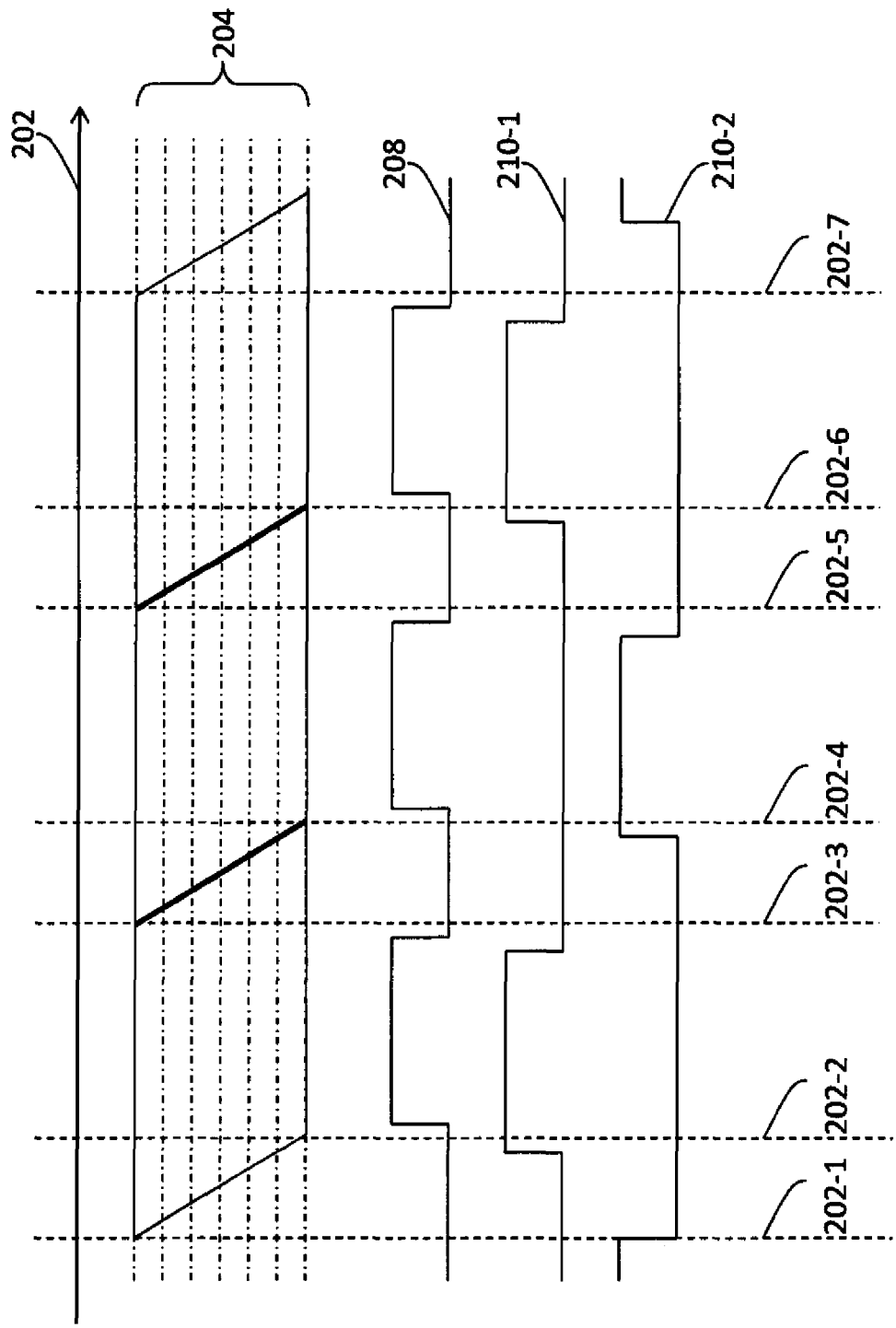

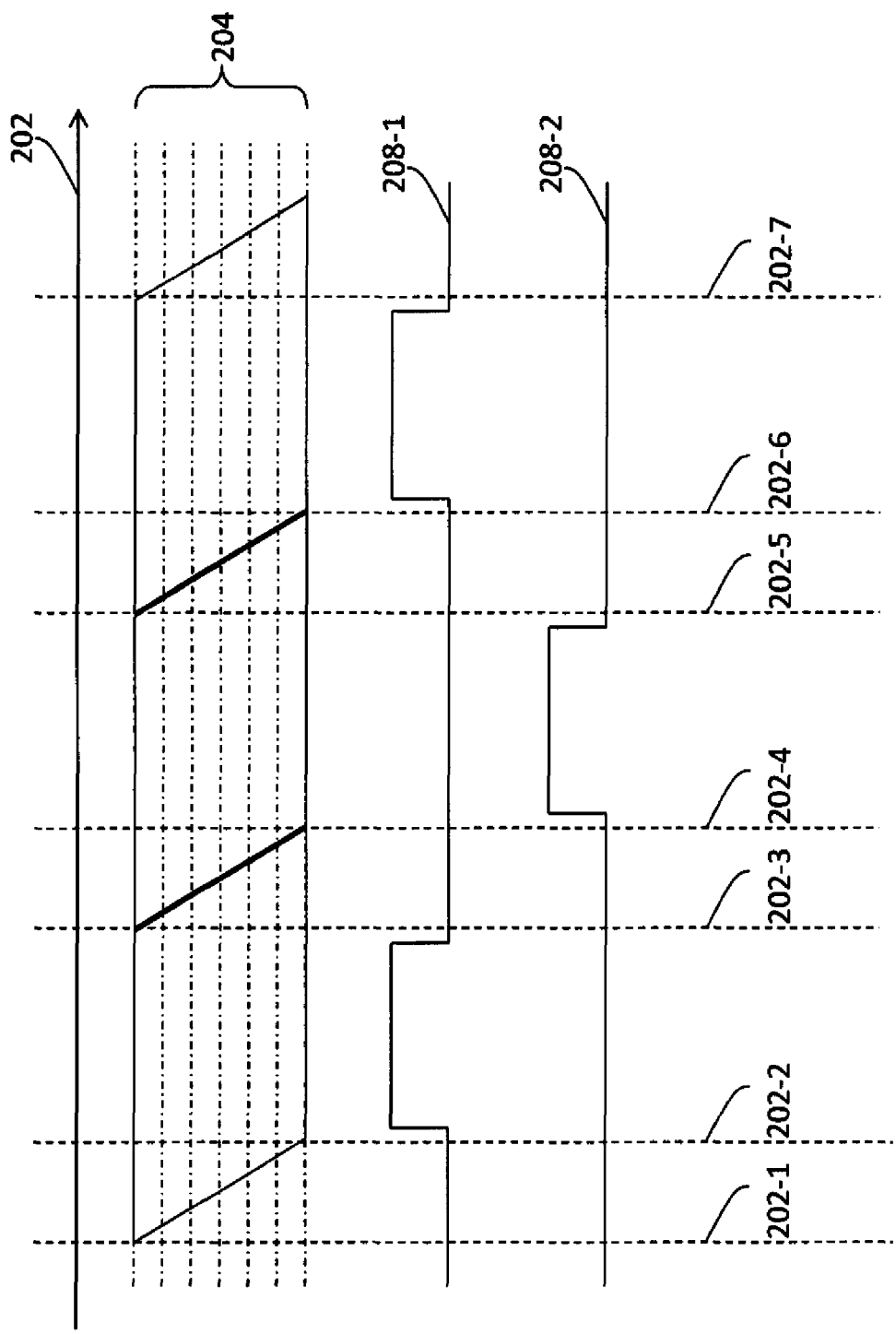

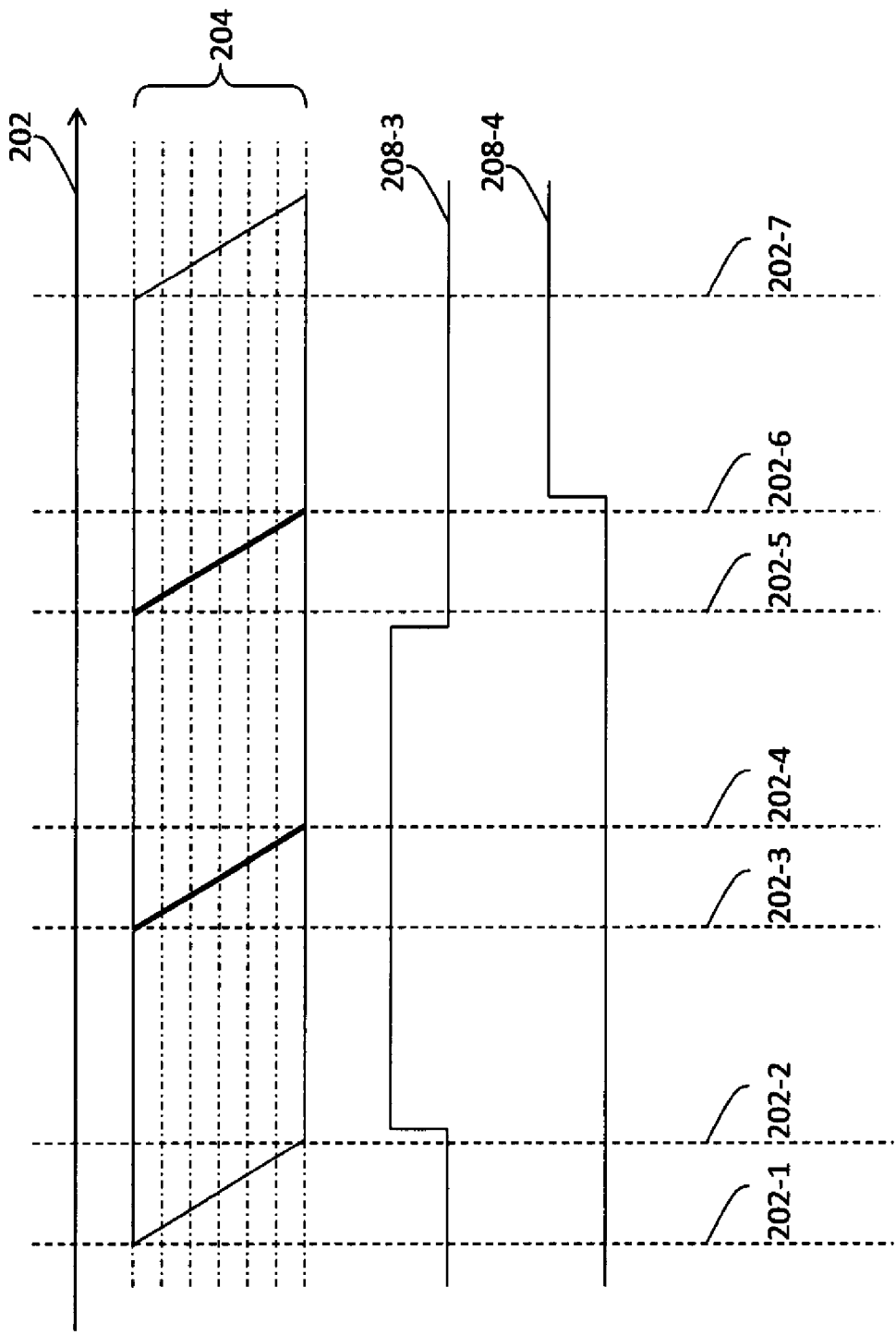

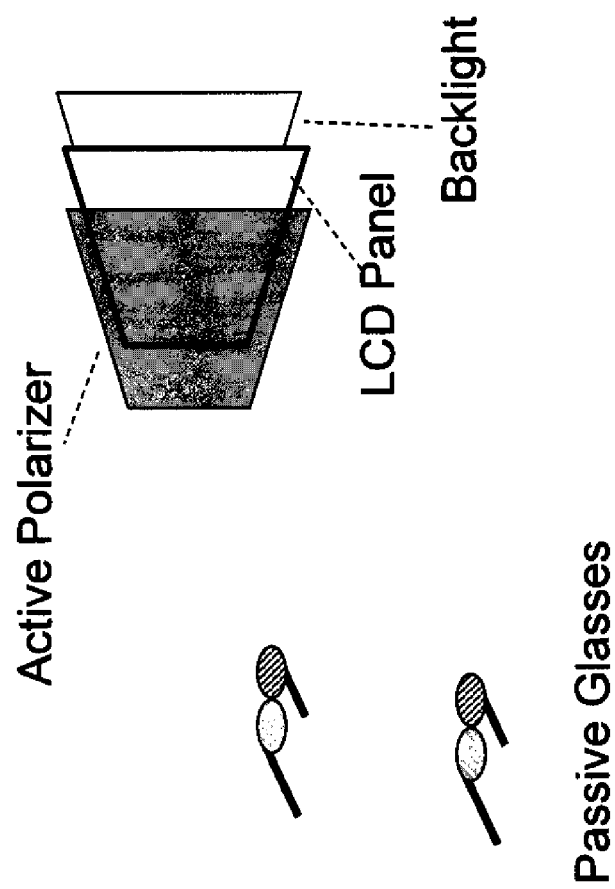

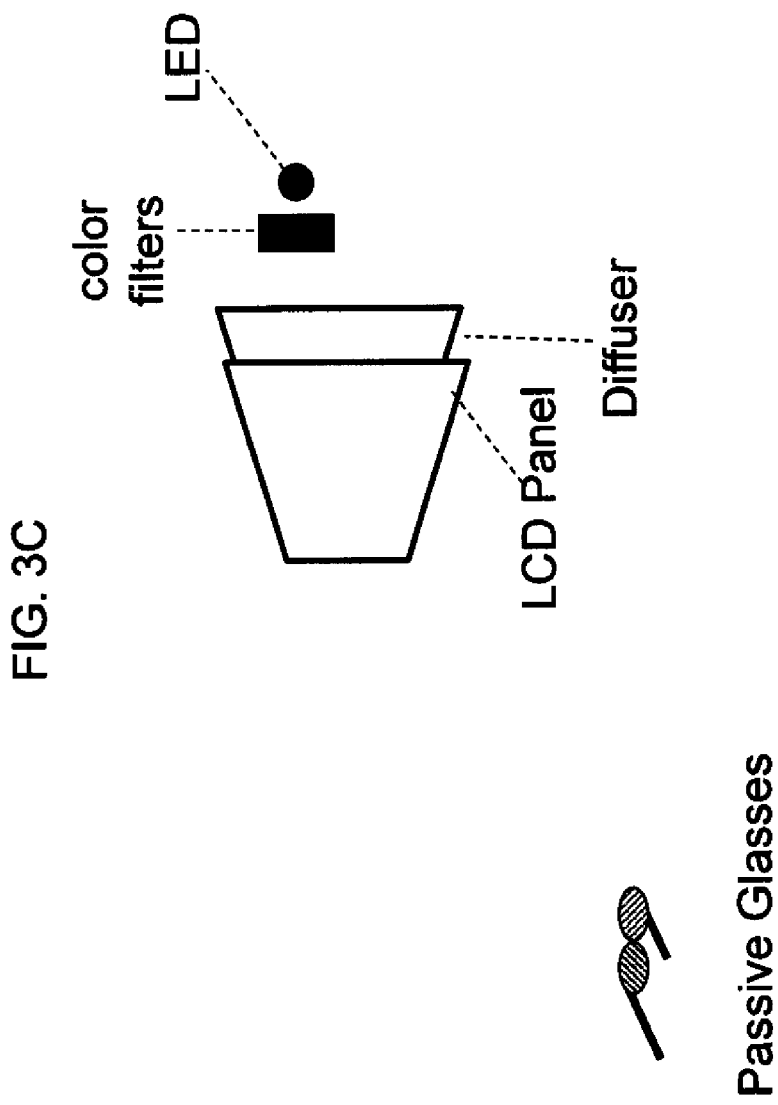

in a first time interval during which one or more back light units of a display system are turned off, output a complete set of left pixel values in a left frame to a display panel of the display system  410 in a second time interval during which the complete set of left pixel values in the left frame has been outputted to the display panel of the display system, turn on the one or more back light units to illuminate the display panel  420

FIG. 4

BACK LIGHT UNIT FOR STEREOSCOPIC DISPLAY

CROSS-REFERENCE TO RELATED APPLICATIONS

This application claims priority to U.S. Provisional Patent Application No. 61/359,344 filed 28 Jun. 2010, hereby incorporated by reference in its entirety.

TECHNOLOGY

The present invention relates generally to display systems, and in particular, to display systems that display three-dimensional (3D) images.

BACKGROUND

In frame-sequential 3D display systems, image frames from left and right perspectives may be alternatively displayed. In these systems, a left frame is followed by a right frame, which in turn is followed by a subsequent left frame, and so on. When left or right frames are shown, a viewer may be restricted to see the frames only through shuttered glasses. Ideally, a left frame is seen by the user's left eye only, while a right frame is seen by the user's right eye only. However, crosstalk between frames of different perspectives typically occurs in these display systems, as a frame cannot be instantaneously replaced with a new frame in these display systems.

In some approaches, duty cycles of shuttered glasses may be significantly reduced and tightly controlled to give the viewer a narrow temporal window during which the viewer may see a frame of a pure perspective. Specifically, the temporal window may be synchronized with the playing of frames in a display system in such a manner that, in the narrow temporal window, the viewer only sees the frame of a pure perspective such as a left frame or a right frame when the frame of the pure perspective has fully replaced a previous frame of a different perspective. However, since the temporal window is narrow, the user may perceive relatively dim images, and most of the backlight is wasted when the viewer is blocked from seeing any frame. Still, the shuttered glasses must be capable of performing fast and responsive switching within very tight timing requirements, in order to realize a precise synchronization of the operation of the shuttered glasses with the playing of frames. As frame rates of display systems are ever increasing, for example, to 240 hz and above, these problems exacerbate and become readily apparent.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A through FIG. 2E illustrate example operation of 3D display systems, according to possible embodiments of the present invention;

FIG. 3A through FIG. 3C illustrate example 3D display systems, according to possible embodiments of the present invention;

FIG. 4 illustrates an example process flow, according to a possible embodiment of the present invention.

DESCRIPTION OF EXAMPLE POSSIBLE EMBODIMENTS

Figure 1A:
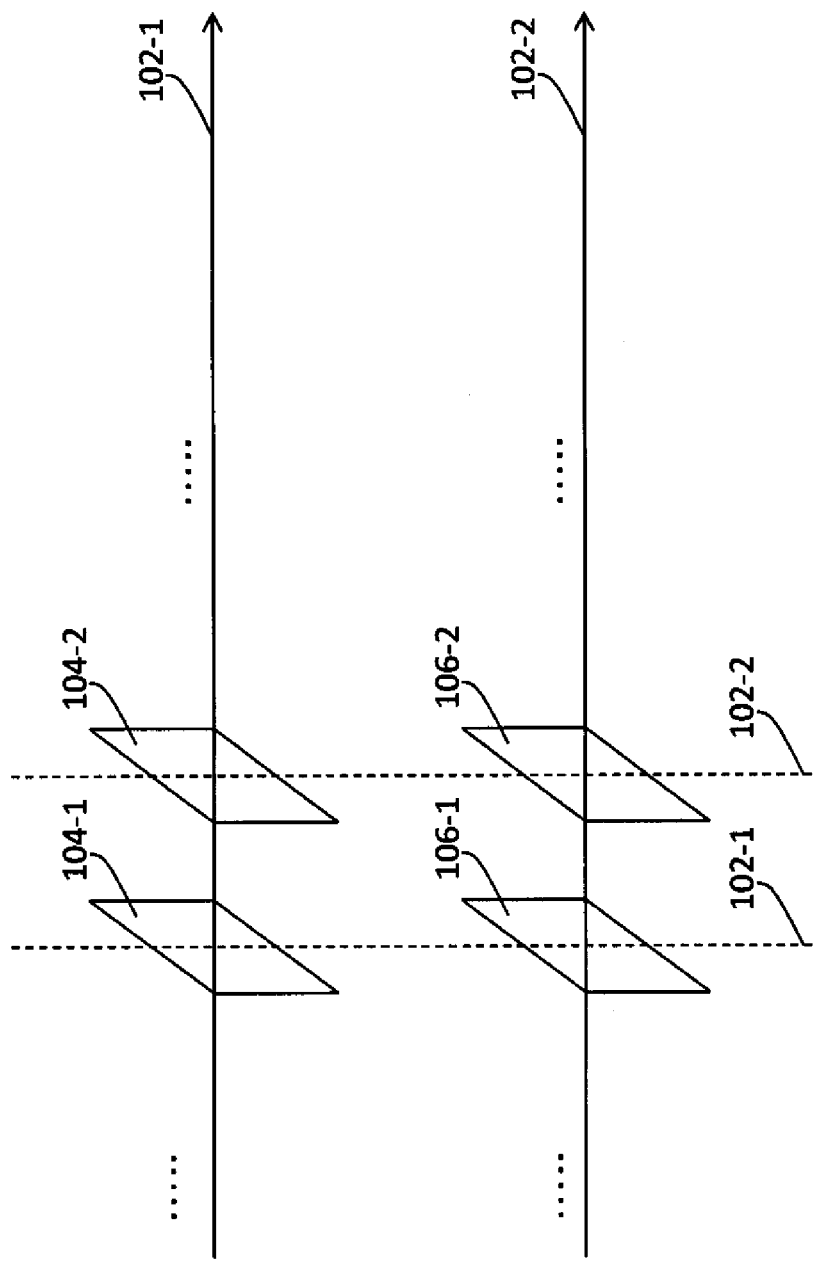
FIG. 1A and FIG. 1B illustrate example image frames, according to possible embodiments of the present invention.

Example possible embodiments, which relate to 3D back light units (BLUs), are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily including, obscuring, or obfuscating the present invention.

Example embodiments are described herein according to the following outline:

1. GENERAL OVERVIEW
2. 3D IMAGE FRAMES
3. ACTIVE SHUTTERED GLASSES
4. ACTIVE POLARIZER
5. DICHROIC BACK LIGHT
6. FRAME REPETITION
7. EXAMPLE PROCESS FLOW
8. IMPLEMENTATION MECHANISMS—HARDWARE OVERVIEW
9. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

In some possible embodiments, a sequence of left frames and a sequence of right frames may be determined from image data received by a 3D display system. The sequences of left and right frames, for example, may contain audiovisual content such as a movie. The left frames are designated for the left eye of a viewer to view, while the right frames are designated for the right eye of the viewer to view.

Under techniques described herein, BLUs in a display system may be controlled in such a way as to only provide illumination to an image in a relatively long time interval during which the image viewable to a viewer comprises a full set of pixel values for the frame.

For example, in a first time interval during which one or more BLUs of a display system are turned off, a complete set of left pixel values in a left frame is outputted to a display panel of the display system. During this first time interval while the complete set of left pixel values is replacing previous pixel values in a right frame, the display panel is not illuminated or viewable. However, in a second time interval during which the complete set of left pixel values in the left frame has been outputted to the display panel of the display system, the BLUs are turned on to illuminate the display panel. The second time interval is subsequent to, and is not overlapped with, the first time interval in this example. Thus, a viewer will be able to see the left frame without any content from the right frame. In another example, the first time interval and the second time interval may have an overlap, which may be, but is not limited to short, insignificant overlap. Thus, a viewer will be able to see the left frame with little content from the right frame.

Similarly, in a third time interval during which the BLUs are turned off, a complete set of right pixel values in a right frame is outputted to the display panel. Then, in a fourth time interval during which the complete set of right pixel values in the right frame has been outputted to the display panel, the BLUs is turned on to illuminate the display panel. The third time interval is subsequent to, and is not overlapped with, the fourth time interval in this example. Thus, the viewer will be able to see the right frame without any content from a left frame. In another example, the third time interval and the fourth time interval may have an overlap, which may be, but is not limited to short, insignificant overlap. Thus, a viewer will be able to see the right frame with little content from the left frame.

In a 3D display system as described herein, in some embodiments, when the one or more BLUs are turned off, a viewer's active shuttered glasses may be either on or off. Since the image is not illuminated, the viewer is prevented from seeing crosstalk between the left frame and the right frame, even if the viewer's active shuttered glasses is on for one perspective or both perspectives.

For the purpose of the present invention, the term "turned on" may refer to one or more BLUs are powered on to provide illumination to a display panel, but may also refer to a state of one or more BLUs in which light from the one or more BLUs is illuminating the display panel. For example, an electronic switch, a movable mechanical mirror, a controllable light filter, etc. may be used to cause the one or more BLUs to be in a state in which light from the one or more BLUs is illuminating the display panel.

For the purpose of the present invention, the term "turned off" may refer to one or more BLUs are powered off, but may also refer to a state of one or more BLUs in which no or little light from the one or more BLUs is illuminating the display panel. For example, an electronic switch, a movable mechanical mirror, a controllable light filter, etc. may be used to cause the one or more BLUs to be in a state in which no or little light from the one or more BLUs is illuminating the display panel.

In some possible embodiments, the viewer may view images through (active) shuttered glasses, the opening of which for a particular perspective may be controlled when a shuttered-glasses controller receives control signals from a display control mechanism of the 3D display system. In some other possible embodiments, the viewer may view images through passive glasses such as polarized glasses, dichroic glasses, etc. For example, the left perspective of the shuttered glasses may permit only transmission of light with particular types of physical attributes, while the right perspective of the shuttered glasses may permit only transmission of light with different types of physical attributes. Examples of physical attributes as described herein may be, but are not limited to, polarization directions or wavelengths, etc.

Unlike other 3D display systems in which duty cycles of shuttered glasses are deliberately set to very narrow windows in order to avoid crosstalk between consecutive frames of different perspectives, in 3D display systems that implement 3D BLU techniques as described herein, duty cycles of shuttered glasses are not required to be set to very narrow windows but may be relatively lengthened.

Unlike other 3D display systems in which delays are deliberately inserted to avoid crosstalk between consecutive frames of different perspectives, in 3D display systems that implement 3D BLU techniques as described herein, delays may or may not be inserted between consecutive composite frames.

In some possible embodiments, mechanisms as described herein form a part of a display system, including but not limited to a handheld device such as a wireless phone, a game player, personal digital assistant, a television, a laptop computer, netbook computer, cellular radiotelephone, electronic book reader, point of sale terminal, desktop computer, computer workstation, computer kiosk, and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. 3D Image Frames

FIG. 1A illustrates example image data that comprises a sequence of left frames (e.g., 104-1, 104-2, etc.) along a media time direction 102 and a sequence of right frames (e.g., 106-1, 106-2, etc.) along the same media time direction 102. As used herein, the term "media time" may refer to a media time point in a sequence of media time points that make up the total playing time of the image data. For example, if the image data is of a movie, a media time of the image data may be a media time point in the sequence of media time points that make up this two-hour playing time of the movie. While the image data may be played, paused, stopped, rewound, forwarded arbitrarily in real time, the total playing time, or the sequence of media time points, of the image data is an intrinsic property of the image data. As illustrated in FIG. 1A, the sequence of media time points comprises a plurality of media time points (e.g., 102-1, 102-2, etc.) along a media time direction such as 102. As used herein, the term "media time direction" refers to the particular direction along which the sequences of frames in the image data are to be normally played by a media player.

In some possible embodiments, each second of normal playing time of the image data may comprise 24 media time points (e.g., 102-1, 102-2, etc.). In some other embodiments, each second of the normal playing time may comprise a different number of media time points, such as, without limitation, 60, 72, or 128 media time points.

At each media time point along the media time direction 102, there are (1) a left frame from the sequence of left frames, and (2) a corresponding right frame from the sequence of right frames, respectively for the left and right eyes of the view at that media time point. For example, as illustrated, at media time point 102-1, there are two frames: left frame 104-1 and right frame 106-1 in the image data.

Figure 1B:
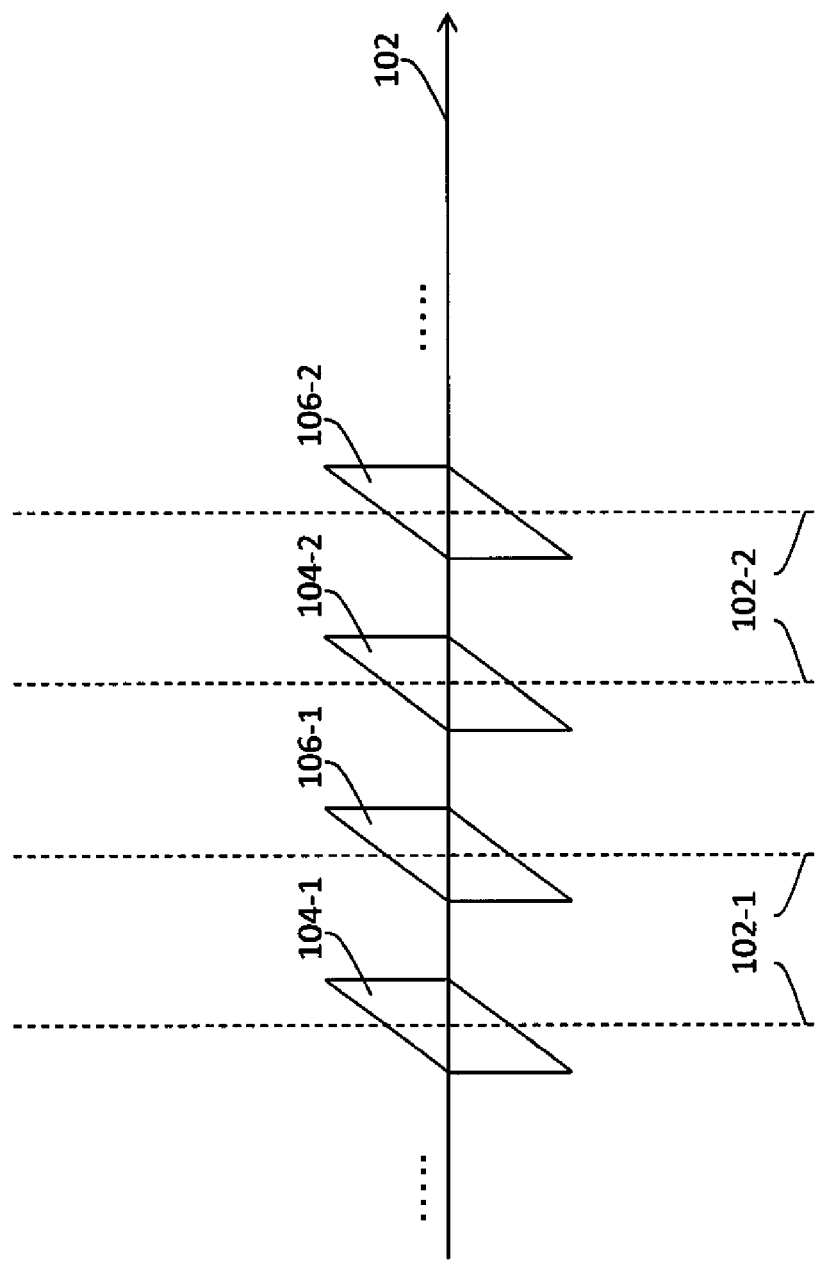

In some possible embodiments as illustrated in FIG. 1B, the sequence of left frames and the sequence of right frames may be provided in a single overall sequence of frames. A 3D display system as described herein is able to determine, based on the image data, any individual left frame or right frame (e.g., 104-1, 106-1, etc.) therein.

3. Active Shuttered Glasses

Figure 2E:
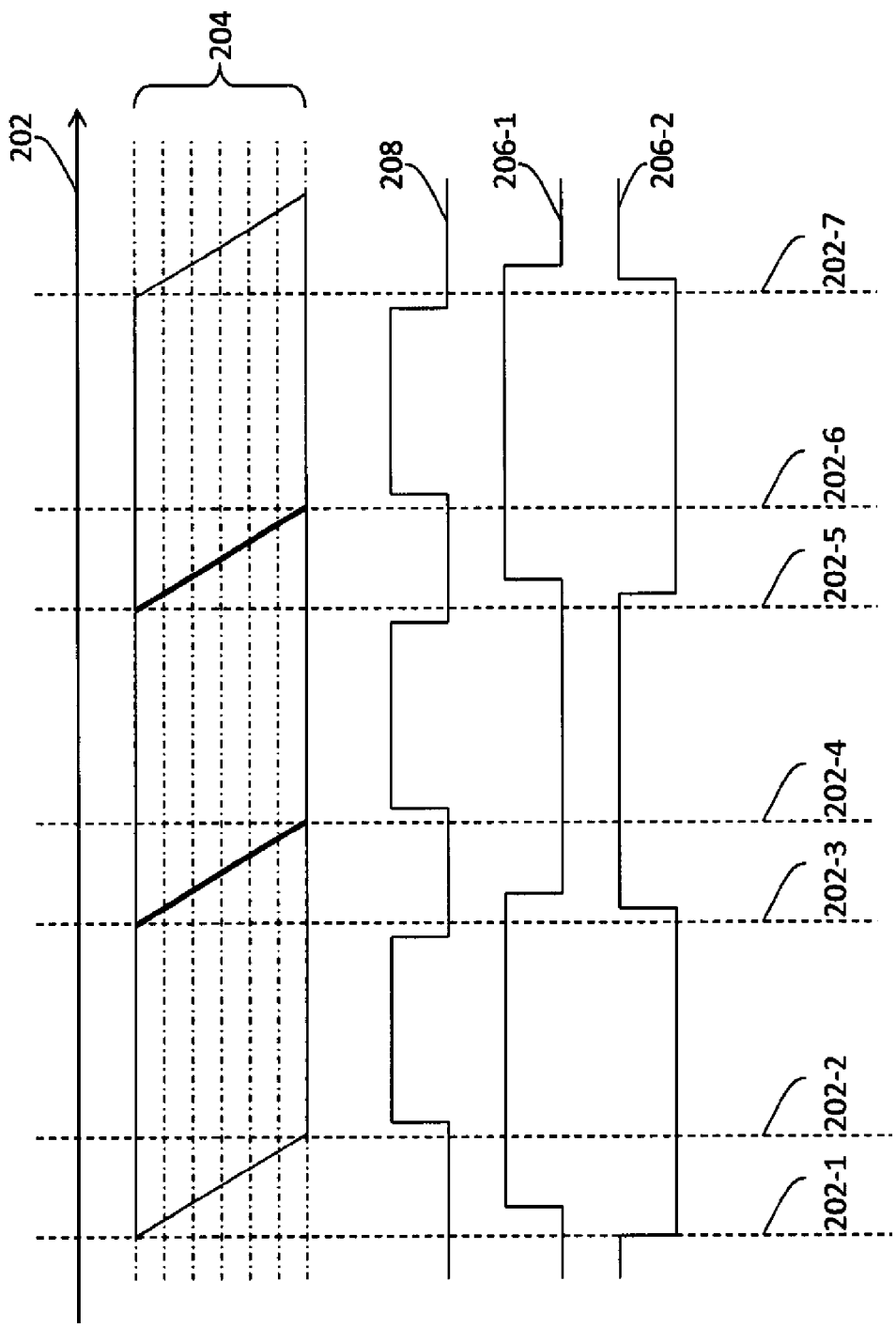

FIG. 2A illustrates an example operation of a 3D display system that works with shuttered glasses. In some possible embodiments, left and right frames, even sharing a same media time point, may be alternatively and sequentially scanned and displayed along a system time direction 202. For example, at system time point 202-1, the 3D display system may start loading a first left frame. This left frame may, for example, be frame 104-1 derived from the image data in FIG. 1A or FIG. 1B. At a subsequent system time point 202-3, the 3D display system loads a first right frame. This first right frame may, for example, be frame 106-1 derived from the image data in FIG. 1A or FIG. 1B. In some possible embodiments, the first left frame and the first right frame (e.g., 104-1 and 106-1) here may correspond to a same media time point (e.g., 102-1). In some other possible embodiments, a left frame of a media time point may be played after a right frame of the same time point. As used herein, a system time point refers to a runtime in a display system.

In sum, a 3D display system as described herein may present a left frame of a media time point before presenting a right frame of the same media time point or may present a right frame of a media time point before presenting a left frame of the same media time point. As changes between intra-perspective frames are less drastic than changes between inter-perspective frames, and as a viewer's eyes typically retains visual memory for a duration greater than $1/24$ of a second, even if frames of the same media time point are played in different system time points, so long as left frames are directed to the left eye of the viewer, right frames are directed to the right eye, and a sufficient number of these frames are presented to the viewer per unit time, the viewer may perceive 3D displaying effects.

To present a frame, the display system may use a plurality of display segments 204, in some possible embodiments, arrayed in a first spatial direction of a display panel, to output pixel values in frames into a display area of the display panel. Each of the display segments 204 may be configured to output pixel values in, along a second spatial direction of the display panel, a linear rectangular block of pixels of the frames. This linear rectangular block of pixels of the frames may share a same or similar location in a plurality of coordinate points along the first spatial direction.

The second spatial direction may, but is not limited to, be orthogonal to the first spatial direction. For example, the first spatial direction may be the top-to-bottom vertical direction of the display panel, while the second spatial direction may be the left-to-right horizontal direction of the display panel. Pixel values outputted to a linear rectangular block of pixels of the frames in a display segment may comprise pixel values for one or more horizontal lines of pixels in the frames. The one or more horizontal lines of pixels in these frames are to be displayed to the viewer at a particular coordinate point along the vertical direction.

In FIG. 2A, from system time point 202-1 to system time point 202-2, the display system starts outputting (or loading) pixel values in left frame 104-1 in all display segments 204 along the vertical direction. At system time point 202-2, the display system finishes outputting pixel values in left frame 104-1 in all the display segments 204. Between system time points 202-2 and 202-3, the display system holds a complete set of pixel values in left frame 104-1. From system time point 202-3, the display system starts outputting pixel values in right frame 106-1 in a manner similar to that used for left frame 104-1 as described. After the outputting of pixel values in right frame 106-1, pixel values in a second left frame, e.g., 104-2, are outputted in a manner similar to that used for outputting pixel values in left frame 104-1 and right frame 106-1. This process continues until all left and right frames in the image data are presented by the display system.

In some possible embodiments, during a time period from system time point 202-1 and system time point 202-2, the display panel is loaded with pixels values comprising a mixture of left frame 104-1 and a previous right frame, as the previous right frame is gradually being replaced by left frame 104-1 up to system time point 202-2. In some possible embodiments, as indicated by a first waveform 206-1 for the left perspective of a viewer's shuttered glasses, the viewer's shuttered glasses may be open for the left perspective during an entirety (or, alternatively, a portion (not shown)) of the time period between system time points 202-1 and 202-2, and beyond to about system time point 202-3. In some possible embodiments, as indicated by a BLU waveform 208, to prevent the viewer from seeing partial imagery from the previous right frame as well as partial imagery from left frame 104-1, the BLUs of the display system are turned off between this time interval—e.g., from system time point 202-1 to system time point 202-2. The BLU may be turned on within the time interval from system time point 202-2 to system time point 202-3, while the left perspective of the viewer's shuttered glasses is open, to allow a completely loaded left frame 104-1 to be seen by the viewer so long as the viewer's shuttered glasses is open for the left perspective during at least a portion of this time interval.

Similarly, in some possible embodiments, during a time period from system time point 202-3 and system time point 202-4, the display panel is loaded with pixels values comprising a mixture of left frame 104-1 and right frame 106-1, while left frame 104-1 is gradually being replaced by right frame 106-1 up to system time point 202-4. In some possible embodiments, as indicated by a first waveform 206-2 for the right perspective of the viewer's shuttered glasses, the viewer's shuttered glasses may be open for the right perspective during an entirety (or, alternatively a portion (not shown)) of that period, and beyond to about system time point 202-5. In some possible embodiments, as indicated by the BLU waveform 208, to prevent the viewer from seeing partial imagery from right frame 106-1 as well as partial imagery from left frame 104-1, the BLUs of the display system are turned off in the time interval from system time point 202-3 to system time point 202-4. The BLU may be turned on within the time interval from system time point 202-4 to system time point 202-5, while the right perspective of the viewer's shuttered glasses is open, to allow a completely loaded right frame 106-1 to be seen by the viewer so long as the viewer's shuttered glasses is open for the right perspective during at least a portion of this time interval.

For the purpose of the present invention, in embodiments in which the viewer's glasses are active, the state changes of the viewer's glasses may, but need not to, be synchronized to the state changes of the BLUs. For example, while the BLU may be turned on between system time points 202-2 and 202-3, the left perspective of the viewer's glasses may be turned any time so long as a time interval during which the left perspective is on has some overlap with another time interval during which the BLUs is on. As the first waveform 206-1 of FIG. 2E indicates, in some embodiments, the left perspective of the viewer's glasses may change from an off to an on state between system time points 202-1 and 202-2, and change from the on state back to the off state after system time point 203-3. The state changes of the viewer's glasses may occur at different times that those illustrated. For example, in some other embodiments, the left perspective of the viewer's glasses may change from an off to an on state after system time point 202-2, and change from the on state back to the off state before system time point 203-3. Thus, these and other variations of state changes of a viewer's glasses so long as the viewer is exposed to an image frame of a perspective with little or no overlap with another image frame of a different perspective through the control of the BLUs are within the scope of the present invention.

In some possible embodiments, the BLUs may be turned off longer than the time intervals as during which pixel values from one frame are replacing, in the display panel, pixel values from another frame. A longer time interval may be used to cover the transition time between display state changes as pixel values from one frame replace pixel values from a previous frame. For example, the BLUs may stay turned off for a few nanoseconds, microseconds, milliseconds, etc., after system time point 202-2. Thus, in the display system implementing 3D BLU techniques as described herein, the viewer does not see crosstalk between frames of different perspectives, even if the viewer's shuttered glasses may have a longer period for maintaining each opening of a left or right perspective or for transitioning between perspectives.

Figure 3A:
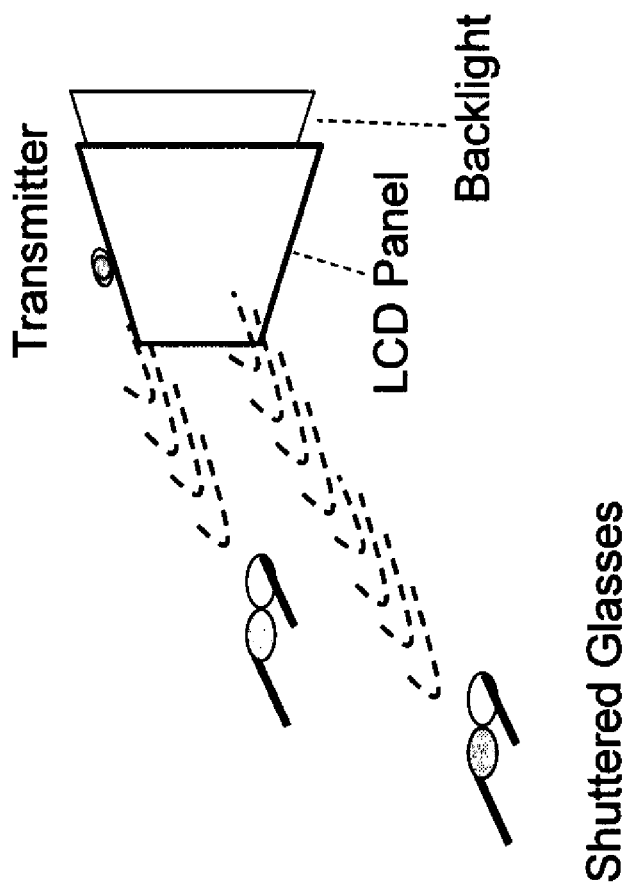

FIG. 3A illustrates an example 3D system that may be used to implement the operations illustrated in FIG. 2A. In some possible embodiments, the 3D system may comprise an LCD-based display panel illuminated, maybe through a diffuser, by BLUs located on the other side of a viewer. The 3D display system may further comprise a transmitter that sends control signals to control which of the left and right perspectives a viewer's shuttered glasses should be open at a particular time. In some possible embodiments, the viewer's shuttered glasses may be controlled by the control signals to close for both left and right perspectives at the same time.

4. Active Polarizer

FIG. 2B illustrates an example operation of a 3D display system that works with one or more active polarizers. The active polarizers may be in a left polarization state in which the light exiting from the active polarizers is of a first polarization direction that is viewable through the left perspective of a viewer's polarized glasses. The active polarizers may also be in a right polarization state in which the light exiting from the active polarizers is of a second polarization direction that is viewable through the right perspective of the viewer's polarized glasses. Additionally and/or optionally, the active polarizers may also be in a dark polarization state in which the light with any polarization direction is blocked from exiting from the active polarizers towards the viewer.

In some possible embodiments, the first and second polarization directions may be orthogonal to each other. In an example, the first and second polarization directions may be orthogonal linear polarization directions. In another example, the first and second polarization directions may be circular polarization directions. The first and second polarization directions may be clockwise and counterclockwise directions, respectively. Any type of orthogonal polarization directions may be configured using the described system.

In some possible embodiments, where active polarizers are used in the 3D display system, a viewer's polarized glasses may be passive, comprising a left glass configured to view the light in the left polarization state from the active polarizers and a right glass configured to view the light in the right polarization state from the active polarizers.

In some possible embodiments, during the time period from system time point 202-1 and system time point 202-2, the display panel is loaded with pixel values comprising a mixture of left frame 104-1 and a previous right frame, as the previous right frame is gradually being replaced by left frame 104-1 up to system time point 202-2. In some possible embodiments, as indicated by a third waveform 210-1 for a left polarization state of the active polarizers, the light exiting from the active polarizers may possess a polarization direction that matches that of the left perspective of a viewer's polarized glasses during a whole or a portion of the time period between system time points 202-1 and 202-2. In some possible embodiments, as indicated by the BLU waveform 208, to prevent the viewer from seeing partial imagery from the previous right frame as well as partial imagery from left frame 104-1, the BLUs of the display system are turned off between this time interval—e.g., from system time point 202-1 to system time point 202-2. The BLU may be turned on within the time interval from system time point 202-2 to system time point 202-3, while the active polarizers are in the left polarization state, to allow a completely loaded left frame 104-1 to be seen by the viewer.

Similarly, in some possible embodiments, during the time period from system time point 202-3 and system time point 202-4, the display panel is loaded with pixels values comprising a mixture of left frame 104-1 and right frame 106-1, while left frame 104-1 is gradually being replaced by right frame 106-1 up to system time point 202-4. In some possible embodiments, as indicated by a fourth waveform 210-2 for a left polarization state of the active polarizers, the light exiting from the active polarizers may possess a polarization direction that matches that of the right perspective of a viewer's polarized glasses during a whole or a portion of the time period between system time points 202-3 and 202-4. In some possible embodiments, as indicated by the BLU waveform 208, to prevent the viewer from seeing partial imagery from right frame 106-1 as well as partial imagery from left frame 104-1, the BLUs of the display system are turned off between this time interval, e.g., from system time point 202-3 to system time point 202-4. The BLU may be turned on within the time interval from system time point 202-4 to system time point 202-5, while the active polarizers are in the right polarization state, to allow a completely loaded right frame 106-1 to be seen by the viewer.

As noted earlier in connection with a shuttered 3D display system, in some possible embodiments, the BLUs in the 3D display system with active polarizers may be turned off longer than the time intervals as during which pixel values from one frame are replacing, in the display panel, pixel values from another frame. A longer time interval may be used to cover the transition time between display state changes as pixel values from one frame replace pixel values from a previous frame. For example, the BLUs may stay turned off for a few nanoseconds, microseconds, milliseconds, etc., after system time point 202-2. Thus, in the display system implementing 3D BLU techniques as described herein, the viewer does not see crosstalk between frames of different perspectives, even if the active polarizers may have a longer period for staying in each left or right polarization state or for transitioning between perspectives.

FIG. 3B illustrates an example 3D system that may be used to implement the operations illustrated in FIG. 2B. In some possible embodiments, the 3D system may comprise an LCD-based display panel illuminated, maybe through a diffuser, by BLUs located on the other side of a viewer. The 3D display system may further comprise an active polarizer that allows light with a particular polarization state to exit, if at all. In some possible embodiments, the display system does not comprise a transmitter that sends control signals to control which of the left and right perspectives a viewer's shuttered glasses should be open at a particular time. In some possible embodiments, the viewer's shuttered glasses may be preconfigured or statically configured with a left perspective to view light in a left polarization state from the active polarizer and a right perspective to view light in a right polarization state from the active polarizer.

5. Dichroic Back Light

FIG. 2C illustrates example operation of a 3D display system that works with one or more dichroic BLUs, while a viewer wears (passive) dichroic glasses to view 3D images. The dichroic BLUs may emit light in two sets of wavelengths (or frequencies). Frequencies in one of the two sets of wavelengths do not overlap or intersect with frequencies in the other of the two sets of wavelengths. Light with a first set of wavelengths may be of wavelengths that are viewable through the left perspective of a viewer's dichroic glasses. Light with a second set of wavelengths may be of wavelengths that are viewable through the right perspective of a viewer's dichroic glasses. Additionally and/or optionally, the dichroic BLUs may be controllable to emit only light with the first set of wavelengths, only light with the second set of wavelengths, or not to emit any light.

In some possible embodiments, each set of wavelengths comprises light with different colors that are configured to reproduce other colors in a color space supported by the 3D display system. For the purpose of this invention, any non-overlapping sets of wavelengths may be configured.

In some possible embodiments, where dichroic BLUs are used in the 3D display system, a viewer's dichroic glasses may be passive, comprising a left glass configured to view the light with wavelengths in the first set of wavelengths and a right glass configured to view the light with wavelengths in the second set of wavelengths.

In some possible embodiments, during the time period from system time point 202-1 and system time point 202-2, the display panel is loaded with pixels values comprising a mixture of left frame 104-1 and a previous right frame, as the previous right frame is gradually being replaced by left frame 104-1 up to system time point 202-2. In some possible embodiments, as indicated by a first BLU waveform 208-1 and a second BLU waveform 208-2, the BLUs with both sets of wavelengths may be turned off between this time interval, e.g., from system time point 202-1 to system time point 202-2, in order to prevent the viewer from seeing partial imagery from the previous right frame as well as partial imagery from left frame 104-1. The BLU with the first set of wavelengths may be turned on within the time interval from system time point 202-2 to system time point 202-3 to allow a completely loaded left frame 104-1 to be seen by the viewer through the left perspective of the dichroic glasses.

Similarly, in some possible embodiments, during the time period from system time point 202-3 and system time point 202-4, the display panel is loaded with pixels values comprising a mixture of left frame 104-1 and right frame 106-1, while left frame 104-1 is gradually being replaced by right frame 106-1 up to system time point 202-4. In some possible embodiments, as indicated by the first BLU waveform 208-1 and the second BLU waveform 208-2, the BLUs with both sets of wavelengths may be turned off between this time interval, e.g., from system time point 202-3 to system time point 202-4, in order to prevent the viewer from seeing partial imagery from right frame 106-1 as well as partial imagery from left frame 104-1. The BLU with the second set of wavelengths may be turned on within the time interval from system time point 202-4 to system time point 202-5 to allow a completely loaded right frame 106-1 to be seen by the viewer through the right perspective of the dichroic glasses.

In some possible embodiments, the dichroic BLUs in the 3D display system may be turned off longer than the time intervals as during which pixel values from one frame are replacing, in the display panel, pixel values from another frame. A longer time interval may be used to cover the transition time between display state changes as pixel values from one frame replace pixel values from a previous frame. For example, the BLUs may stay turned off for a few nanoseconds, microseconds, milliseconds, etc., after system time point 202-2. Thus, in the display system implementing 3D BLU techniques as described herein, the viewer does not see crosstalk between frames of different perspectives.

FIG. 3C illustrates an example 3D system that may be used to implement the operations illustrated in FIG. 2C. In some possible embodiments, the 3D system may comprise an LCD-based display panel illuminated, optionally through a diffuser, by dichroic BLUs located on the other side of a viewer. The dichroic BLUs may produce light with two sets of wavelengths. For example, the light may be color-filtered to produce these two sets of wavelengths with wavelengths in one set not overlapped with wavelengths in the other set. A viewer's dichroic glasses may be passive, and may comprise a left perspective in which light with wavelengths in a first set in the two sets of wavelengths is viewable but light with wavelengths in the other set, e.g., a second set, in the two sets of wavelengths is blocked. A viewer's dichroic glasses may be passive, and may comprise a left perspective in which light with wavelengths in a first set in the two sets of wavelengths is viewable but light with wavelengths in the other set, e.g., a second set, in the two sets of wavelengths is blocked. The viewer's dichroic glasses may further comprise a right perspective in which light with wavelengths in the second set in the two sets of wavelengths is viewable but light with wavelengths in the first set in the two sets of wavelengths is blocked. Examples of the color filters may include, but are not limited to those described in U.S. Patent Publication No. 2010/0060857, filed on May 9, 2008, the entire contents of which are hereby incorporated by reference for all purposes as if fully disclosed herein.

6. Frame Repetition

FIG. 2D illustrates example operation of a 3D display system that works with frame duplication. The 3D display system may comprise left-phase BLUs and right-phase BLUs. In some possible embodiments, the left-phase BLUs and the right-phase BLUs may be the same BLUs as in the example 3D display system illustrated in FIG. 3A or FIG. 3B. In some other embodiments, the left-phase BLUs and the right-phase BLUs may be separate sets of BLUs as in the example 3D display system illustrated in FIG. 3C. For example, the left-phase BLUs may emit light in a first set of wavelengths while the right-phase BLUs may emit light in a second set of wavelengths. In any event, light from the left-phase BLUs may be viewable through the left perspective of a viewer's glasses, while light from the right-phase BLUs may be viewable through the right perspective of a viewer's glasses.

In some possible embodiments, during the time period from system time point 202-1 and system time point 202-2, the display panel is loaded with pixels values comprising a mixture of left frame 104-1 and a previous right frame, as the previous right frame is gradually being replaced by left frame 104-1 up to system time point 202-2. In some possible embodiments, as indicated by a left-phase BLU waveform 208-3 and a right-phase BLU waveform 208-4, both left-phase and right-phase BLUs may be turned off between this time interval, e.g., from system time point 202-1 to system time point 202-2, in order to prevent the viewer from seeing partial imagery from the previous right frame as well as partial imagery from left frame 104-1. In some possible embodiments, the loading of an image frame may be repeated one or more times after replacing a different image frame. For example, after left frame 104-1 replaces a previous right frame, the loading of left frame 104-1 may be repeated one or more times. For example, at system time point 202-3 after left frame 104-1 is held for viewing between system time points 202-2 and 202-3, the loading of left frame 104-1 may be repeated from system time point 202-3 to system time point 202-4 and may be held for viewing until system time point 202-5. In some possible embodiments, the corresponding BLUs, for example, the left-phase BLUs that correspond to left frames, such as 104-1, may be turned on within the time interval from system time point 202-2 to system time point 202-5 to allow a completely loaded left frame 104-1 to be seen by the viewer through the left perspective. In some possible embodiments in which the left-phase BLUs and the right-phase BLUs are different BLUs, the right-phase BLUs may be turned off within the time interval from system time point 202-2 to system time point 202-5 to allow a completely loaded left frame 104-1 to be seen by the viewer through the left perspective.

Similarly, in some possible embodiments, during the time period from system time point 202-5 and system time point 202-6, the display panel is loaded with pixels values comprising a mixture of right frame 106-1 and left frame 104-1, while left frame 104-1 is gradually being replaced by right frame 104-1 up to system time point 202-6. In some possible embodiments, as indicated by the left-phase BLU waveform 208-1 and the right-phase BLU waveform 208-4, the BLUs may be turned off between this time interval, e.g., from system time point 202-5 to system time point 202-6, in order to prevent the viewer from seeing partial imagery from right frame 106-1 as well as partial imagery from left frame 104-1. In some possible embodiments, the loading of an image frame may be repeated one or more times after replacing a different image frame. For example, after right frame 106-1 replaces left frame 104-1, the loading of right frame 106-1 may be repeated one or more times. For example, at system time point 202-7 after right frame 106-1 is held for viewing between system time points 202-6 and 202-7, the loading of right frame 106-1 may be repeated from system time point 202-7 on and may be held for viewing until the next image frame, e.g., 104-2, starts to be loaded. In some possible embodiments, the corresponding BLUs, for example, the right-phase BLUs that corresponds to right frames such as 106-1, may be turned on within the time interval from system time point 202-6 up to a system time point, at which left frame 104-2 starts to be loaded, to allow a completely loaded right frame 106-1 to be seen by the viewer through the right perspective.

7. Example Process Flow

FIG. 4 illustrates an example process flow according to a possible embodiment of the present invention. In some possible embodiments, one or more computing devices or components in a 3D display system, which may be, but is not limited to, a 3D display system illustrated in FIG. 3A through FIG. 3C, may perform this process flow. In block 410, in the 3D display system, in a first time interval (e.g., from system time point 202-1 to system time point 202-2 as illustrated in FIG. 2A) during which one or more BLUs of a display system are turned off, a complete set of left pixel values in a left frame is outputted to a display panel of the display system.

In block 420, in the 3D display system, in a second time interval (e.g., from system time point 202-2 to system time point 202-3 as illustrated in FIG. 2A) during which the complete set of left pixel values in the left frame has been outputted to the display panel of the display system, the one or more BLUs are turned on to illuminate the display panel. Here, the second time interval is subsequent to, and is not overlapped with, the first time interval.

In some possible embodiments, in the 3D display system, in a third time interval during which the one or more first BLUs are turned off, a complete set of right pixel values in a right frame is outputted to the display panel. The third time interval may be subsequent to, and is not overlapped with, the second time interval.

In some possible embodiments, in the 3D display system, in a fourth time interval during which the complete set of right pixel values in the right frame has been outputted to the display panel, the one or more BLUs are turned on to illuminate the display panel. Here, the fourth time interval may be subsequent to, and is not overlapped with, the third time interval.

In some possible embodiments, the 3D display system outputs one or more control signals to cause a viewer's shuttered glasses to open for a left perspective for a particular time interval, which may overlap with the above-mentioned second time interval. In a possible embodiment, the particular time interval encompasses the second time interval.

In some possible embodiments, the one or more BLUs emit lights with first light wavelengths and second different light wavelengths. Here, the first light wavelengths may be configured to transmit through a viewer's glasses for a left perspective but not to transmit through the viewer's glasses for a right perspective. The second light wavelengths may be configured to transmit through the viewer's glasses for the right perspective but not to transmit through the viewer's glasses for the left perspective.

In some possible embodiments, the viewer's glasses may be passive. In some other possible embodiments, the viewer's glasses may be active.

In some possible embodiments, to output the complete set of left pixel values in the left frame to the display panel in block 410, the 3D display system loads pixel values in the complete set of left pixel values to a plurality of display segments of the display panel, and then holds the pixel values in the plurality of display segments of the display panel.

In some possible embodiments, the 3D display system turns on the one or more BLUs to illuminate the display panel at the same time as the complete set of left pixel values has been loaded into the display panel.

In some possible embodiments, the 3D display system turns on the one or more BLUs to illuminate the display panel at a subsequent time to a time at which the complete set of left pixel values has been loaded into the display panel.

In some possible embodiments, the 3D display system sets an active polarizer of the display system to a left polarization direction for a particular time interval that overlaps with the second time interval. In a particular possible embodiment, the particular time interval encompasses the second time interval.

This process may be repeated so that all, or a portion of, the content in the image data is presented to the viewer in a time-sequential manner.

8. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
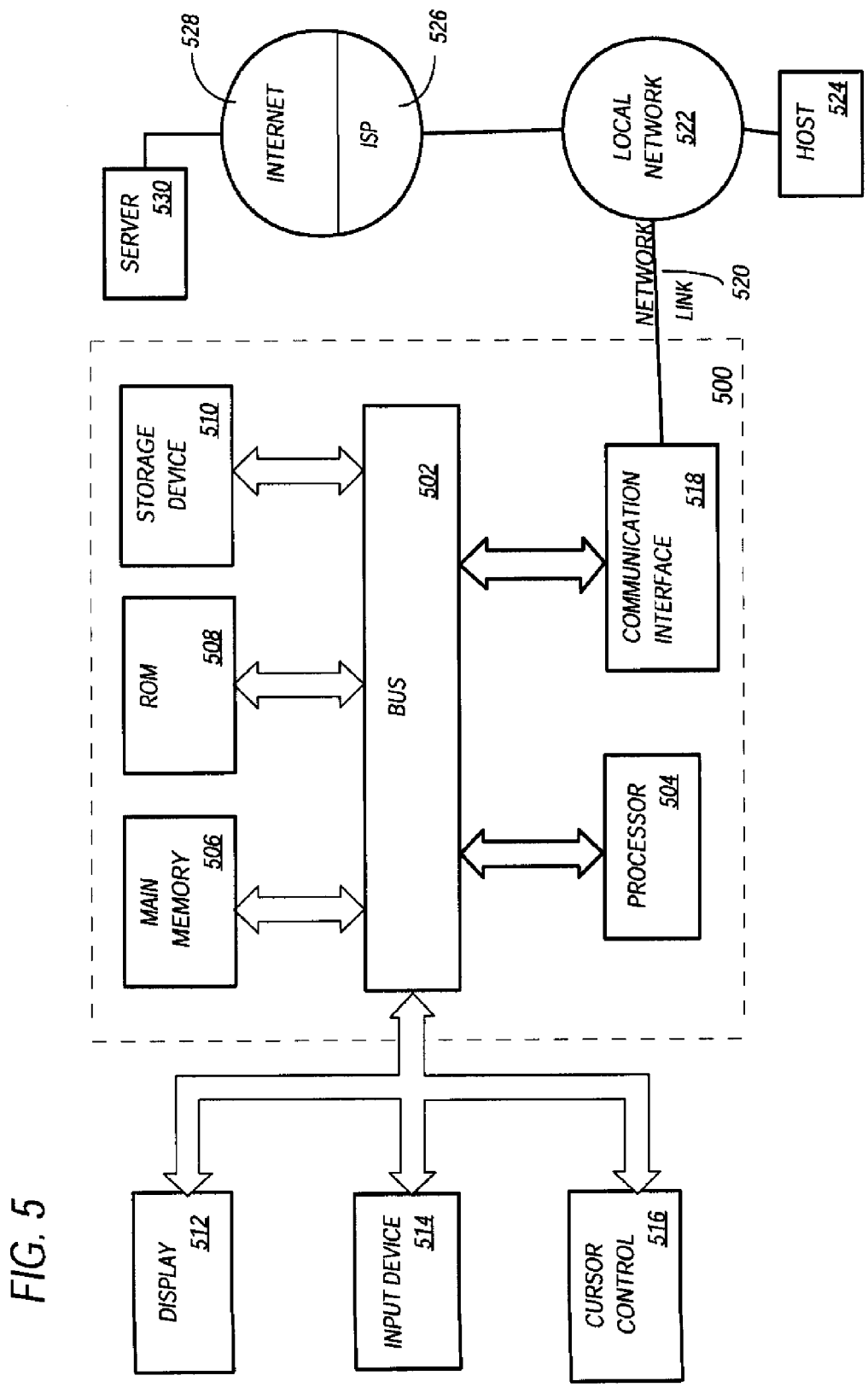
FIG. 5 illustrates an example hardware platform on which a computer or a computing device as described herein may be implemented, according a possible embodiment of the present invention.

For example, FIG. 5 is a block diagram that illustrates a computer system 500 upon which a possible embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

9. Equivalents, Extensions, Alternatives and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method of displaying three-dimensional images, the method comprising:
   in a first time interval during which one or more back light units of a display system are turned off, outputting a complete set of left pixel values in a left frame to a display panel of the display system, wherein outputting the complete set of left pixel values in the left frame to the display panel of the display system further comprises:
      loading pixel values in the complete set of left pixel values to a plurality of display segments of the display panel; and
      holding the pixel values in the plurality of display segments of the display panel; and
   in a second time interval during which the complete set of left pixel values in the left frame has been outputted to the display panel of the display system, turning on the one or more back light units of a first set to illuminate the display panel, wherein the second time interval is subsequent to, and is not overlapped with, the first time interval; and
   repeating the outputting of the complete set of the left pixel values in the left frame to the display panel,
   wherein turning on the one or more back light units of the first set to illuminate the display panel occurs at a subsequent time to a time at which the complete set of left pixel values has been loaded into the display panel, and
   wherein the first set of the one or more back light units emit lights with first light wavelengths, and a second set of the one or more back lights units emit lights with second different light wavelengths.

2. The method of claim 1, further comprising:
   in a third time interval during which the one or more back light units are turned off, outputting a complete set of right pixel values in a right frame to the display panel, wherein the third time interval is subsequent to, and is not overlapped with, the second time interval; and
   in a fourth time interval during which the complete set of right pixel values in the right frame has been outputted to the display panel, turning on the one or more back light units to illuminate the display panel, wherein the fourth time interval is subsequent to, and is not overlapped with, the third time interval.

3. The method of claim 1, wherein the first light wavelengths are configured to transmit through a viewer's glasses for a left perspective but not to transmit through the viewer's glasses for a right perspective; and wherein the second light wavelengths are configured to transmit through the viewer's glasses for the right perspective but not to transmit through the viewer's glasses for the left perspective.

4. The method of claim 3, wherein the viewer's glasses are passive.

5. The method of claim 1, further comprising setting an active polarizer of the display system to a left polarization direction for a particular time interval, wherein the particular time interval overlaps with the second time interval.

6. The method of claim 5, wherein the particular time interval encompasses the second time interval.

7. An apparatus comprising a processor and configured to perform the method recited in claim 1.

8. A non-transitory computer readable storage medium, comprising software instructions, which when executed by one or more processors cause performance of the method recited in claim 1.

* * * * *